US011163769B2

(12) United States Patent
Bodziony et al.

(10) Patent No.: US 11,163,769 B2
(45) Date of Patent: *Nov. 2, 2021

(54) JOINING TWO DATA TABLES ON A JOIN ATTRIBUTE

(71) Applicant: International Business Machines Corporation, Armonk, NY (US)

(72) Inventors: Michal Bodziony, Tegoborze (PL); Konrad K. Skibski, Zielonki (PL); Tomasz Kazalski, Balice (PL); Artur M. Gruszecki, Cracow (PL); Lukasz Gaza, Jankowice (PL)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 16/443,958

(22) Filed: Jun. 18, 2019

(65) Prior Publication Data

US 2019/0303370 A1 Oct. 3, 2019

Related U.S. Application Data

(63) Continuation of application No. 15/663,896, filed on Jul. 31, 2017, now Pat. No. 10,380,112.

(51) Int. Cl.
*G06F 16/00* (2019.01)
*G06F 16/2453* (2019.01)

(52) U.S. Cl.
CPC .. *G06F 16/24544* (2019.01); *G06F 16/24532* (2019.01); *G06F 16/24537* (2019.01)

(58) Field of Classification Search
CPC ......... G06F 16/24544; G06F 16/24537; G06F 16/24532
See application file for complete search history.

(56) References Cited

U.S. PATENT DOCUMENTS 5,899,986 A 5/1999 Ziauddin
6,081,801 A * 6/2000 Cochrane ............... G06Q 10/04
(Continued)

FOREIGN PATENT DOCUMENTS

WO 2015087237 A1 6/2015

OTHER PUBLICATIONS

Hilker, "Column Correlation for Multiple Predicates IBM DB2 Community," IBM DB2 Wiki, Toad World Community-Driven Innovation, Published and Revised Mar. 14, 2013, Copyright 2017 Quest Software Inc., 6 pages.
(Continued)

*Primary Examiner* — Leslie Wong
(74) *Attorney, Agent, or Firm* — Jared C. Chaney

(57) ABSTRACT

A computer-implemented method for joining two data tables on a join attribute, where the data tables have at least a first and a second attribute and the second attribute is the join attribute. The method provides a function for associating a computing node to a given record. The function may be used to determine the associated computing node. The records of the two data tables may be distributed to the respective determined computing nodes. The relationship between the values of the first and second attributes may be modelled using a predefined dataset. For each record of the two data tables the values of the first attribute may be re-determined using the corresponding values of the second attribute. The function may be used to re-determine the associated computing node.

10 Claims, 3 Drawing Sheets

(56) References Cited

U.S. PATENT DOCUMENTS

| | | | |
|---|---|---|---|
| 7,647,293 B2 | 1/2010 | Brown et al. | |
| 8,655,877 B2 | 2/2014 | Lariba-Pey et al. | |
| 9,355,127 B2 | 5/2016 | Gaza et al. | |
| 9,830,346 B2* | 11/2017 | Beigel | G06F 16/2282 |
| 10,380,112 B2* | 8/2019 | Bodziony | G06F 16/24544 |
| 2006/0161515 A1 | 7/2006 | Barsness et al. | |
| 2006/0224551 A1* | 10/2006 | Lariba-Pey | G06F 16/2456 |
| 2009/0006399 A1 | 1/2009 | Raman et al. | |
| 2009/0222760 A1 | 9/2009 | Halverson et al. | |
| 2009/0248617 A1* | 10/2009 | Molini | G06F 16/24544 |
| 2011/0302151 A1* | 12/2011 | Abadi | G06F 16/2456 |
| | | | 707/714 |
| 2014/0101129 A1 | 4/2014 | Branish, II et al. | |
| 2015/0149435 A1* | 5/2015 | McKenna | G06F 16/24544 |
| | | | 707/714 |
| 2015/0149513 A1* | 5/2015 | Beigel | G06F 16/2282 |
| | | | 707/809 |
| 2015/0154256 A1 | 6/2015 | McKenna et al. | |

OTHER PUBLICATIONS

Hilker, "Joins in Partitioned Databases," IBM DB2 Community, Toad World Connected Intelligence, Published and Revised Mar. 14, 2013, 4 pages.

Unknown, "High Performance Technique Using Join Collocation in a Massively Parallel Processing Relational Database Implementation," An IP.com Prior Art Database Technical Disclosure, IP.com No. IPCOM000218996D, Electronic Publication Date Jun. 14, 2012, 5 pages.

Unknown, "Collocated join in Netezza," FolksTalk, Printed Jul. 12, 2017, 2 pages.

Bodziony et al., "Joining Two Data Tables on a Join Attribute," U.S. Appl. No. 15/663,896, filed Jul. 31, 2017, IBM.

List of IBM Patents and Patent Applications Treated as Related, Dated Jun. 11, 2019, 2 pages.

* cited by examiner

| TAB1 311 | | | | |
|---|---|---|---|---|
| CD1 | CJ1 | New Hash | Prev. Hash | redistribution |
| 1 | 10 | | 1 | |
| 2 | 22 | 1 | 1 | |
| 3 | 28 | 2 | 2 | |
| 4 | 40 | | 2 | |
| 5 | 48 | 3 | 3 | |
| 6 | 67 | 4 | 3 | Node3>Node4 |
| 7 | 69 | 4 | 4 | |
| 8 | 79 | 4 | 4 | |
| 9 | 95 | 5 | 5 | |
| 10 | 97 | 5 | 5 | |

| TAB2 312 | | | | |
|---|---|---|---|---|
| CD2 | CJ2 | New Hash | Prev. Hash | redistribution |
| 1 | 9 | 1 | 1 | |
| 2 | 20 | | 1 | |
| 3 | 28 | 2 | 2 | |
| 4 | 42 | 2 | 2 | |
| 5 | 48 | 3 | 3 | |
| 6 | 61 | 3 | 3 | |
| 7 | 67 | 4 | 4 | |
| 8 | 79 | 4 | 4 | |
| 9 | 94 | 5 | 5 | |
| 10 | 97 | 5 | 5 | |

JOINING TWO DATA TABLES ON A JOIN ATTRIBUTE

BACKGROUND

The present invention relates to the field of digital computer systems, and more specifically, to a method for joining two data tables on a join attribute.

Databases of a system for massive parallel processing (MPP) may perform better if there is not much data to be exchanged in between nodes of the system. In case of joins in between tables, the optimal situation is if join keys are the same as distribution keys. However, if joining keys are not the same as distribution keys, then data have to be exchanged in between nodes leading to undesirable data performance.

SUMMARY

The present invention provides a computer implemented method, a computer system, and a computer program product of joining two data tables on a join attribute. In an exemplary embodiment, the computer implemented method, the system, and the computer program product include joining two data tables on a join attribute, the data tables having at least a first and a second attribute, the second attribute being the join attribute, the method including providing a function for associating a computing node to a given record based on the value of the first attribute of the given record, determining using the function for each record of the two data tables the associated computing node, distributing the records of the two data tables to the respective determined computing nodes, modeling the relationship between the values of the first and second attributes using a predefined dataset, for each record of the two data tables re-determining the values of the first attribute using the corresponding values of the second attribute based on the modeled relationship, re-determining using the function for each record of the data tables the associated computing node using the re-determined values of the first attribute, in case a record of the data tables whose re-determined computing node is different from the node on which the record is currently distributed re-distributing that record to the re-determined computing node, performing on each computing node of the computing nodes a collocated join of records of the two data tables that are distributed and/or re-distributed in the each computing node, combining the collocated joins results for joining the two data tables.

In another aspect, the invention relates to a computer program product including a computer-readable storage medium having computer-readable program code embodied therewith, the computer-readable program code configured to implement all of steps of the method according to preceding embodiments.

In another aspect, the invention relates to a computer system for joining two data tables on a join attribute, the data tables having at least a first and a second attribute, the second attribute being the join attribute. The computer system is configured for providing a function for associating a computing node to a given record based on the value of the first attribute of the given record, determining using the function for each record of the two data tables the associated computing node, distributing the records of the two data tables to the respective determined computing nodes, modeling the relationship between the values of the first and second attributes using a predefined dataset, for each record of the two data tables re-determining the values of the first attribute using the corresponding values of the second attribute based on the modeled relationship, re-determining using the function for each record of the data tables the associated computing node using the re-determined values of the first attribute, in case a record of the data tables whose re-determined computing node is different from the node on which the record is currently distributed re-distributing that record to the re-determined computing node.

DETAILED DESCRIPTION

Figure 1:
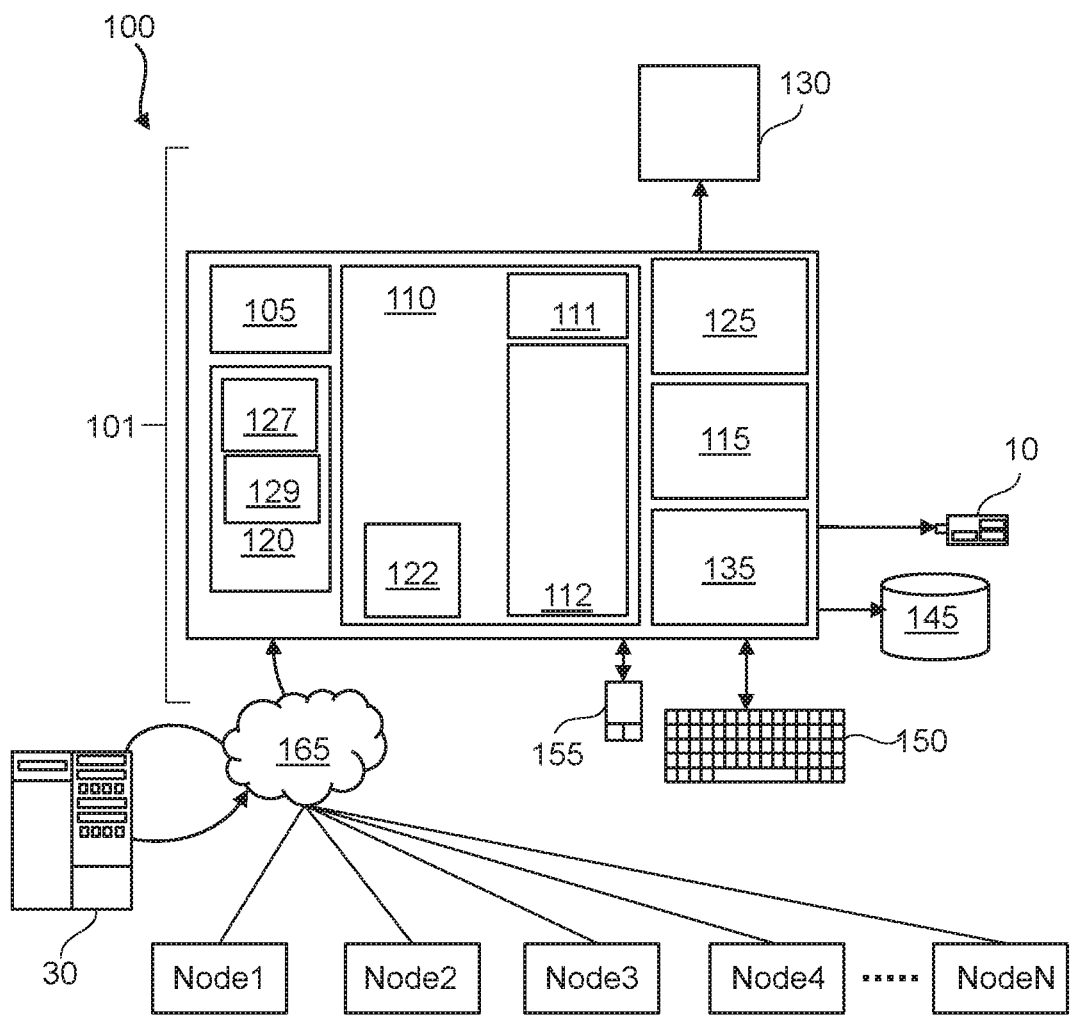
FIG. 1 represents a computerized system, suited for implementing one or more method steps as involved in the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention provides a computer implemented method, a computer system, and a computer program product of joining two data tables on a join attribute. In an exemplary embodiment, the computer implemented method, the system, and the computer program product include providing a function for associating a computing node to a given record based on a value of the first attribute of the given record, determining, using the function for each record of the two data tables, the associated computing node, distributing the records of the two data tables to the respective determined computing nodes, modeling a relationship between the values of the first and second attributes using a predefined dataset, re-determining, for the each record of the two data tables, the values of the first attribute using the corresponding values of the second attribute based on the model of the relationship, re-determining, using the function for the each record of the two data tables, the associated computing node using the re-determined values of the first attribute, for the each record of the two data tables, in response to determining that the re-determined computing node of the each record is different from the node on which the each record is currently distributed, re-distributing the each record to the re-determined computing node, performing collocated joins of the distributed records and the redistributed record, and combining results of the collocated joins, thereby resulting in joining the two data tables.

The term computing "node" is a computer system for processing data with respective physical resources (including memory, Central Processing Units (CPUs), network connections, bandwidth, operating systems, algorithms, etc.). It may be a single computer, blade, or a computer network or a virtualized computing infrastructure with one or more processing cores and with interfaces for data exchange.

The modeling may include determining the general form of the relationship (e.g., linear, exponential, logarithmic); and determining a curve that best represents the data trend. For example, the modelling may include a correlation that allows determining if any relationship exists between the first and second attribute values, regression that allows a "line of best fit" to be determined; or a non-linear and multivariate regression that allows for multiple predictor variables and the determination of "curves of best fit".

The distribution or portioning of the records of the data tables may be performed using a hashing technique. The distribution includes assigning records of the data tables to a node by a hash function over a distribution attribute which is the first attribute.

The present method may for example be used for joining more than two data tables, e.g. by performing the present method on each pair of a sequence of pairs of tables that may result from the more than two data tables to be joined.

The present method may enable collocated joins even if join keys or attributes are not distribution keys. This is by contrast to a conventional method distributing the full two data tables based on the second attribute as the distribution key on the nodes and a collocated join is performed.

The present method may be performed if the distribution attribute (first attribute) and joining attribute (second attribute) are correlated. If the joining attribute is correlated to distribution attribute then it can be optimal to do a collocated join on each node. The stronger correlate the less data have to be redistributed. This way of redistribution maximizes the probability that data are distributed to nodes on each there are already data with the same joining key values.

The present method may enable an optimal distribution of the tables involved in a join operation such that their respective parts in each node become collocated. In other terms, the present method may enable an optimal collocation by placing or distributing records from the data tables to be joined that contain related data in the same computing node. The performance of the join operation may measurably and significantly improve as compared to that of a non-collocated join operation. This is because a collocated join with the present method operation may avoid having to send (or retrieve) data being joined across the network to another server or partition where the join can be performed. The present method may minimize the degree at which the data is to be shared between the nodes such that each computing node may operate on a fragment of data and the results are merged. This may further have the advantage of reducing the data traffic within the computing network connecting the computing nodes.

According to one embodiment, the distributing of the records of the data tables results in a pair of partitions of the two data tables in each of the computing nodes, wherein before modeling: determining a sample of the resulting pairs, and in case the number of pairs of partitions in the sample, on which a collocated join can be performed is higher than a predefined threshold.

This may provide indicators that could help determine that significant amount of data to be joined is already collocated on the same nodes. For example: the sample may be scanned and on this sample two types of joins are done collocated and non-collocated. If the results are below a predefined threshold (e.g. significant number of collocated joins on nodes can be performed) then collocated join may be used.

This may save processing resources that would otherwise be required for data tables that are completely not distributed for allocated join purpose. The present method may particularly be advantageous for refining the distributed databases for the purpose of collocated joins.

According to one embodiment, the sample includes all the resulting pairs of partitions wherein the computing nodes are in idle mode. In idle mode, the calculation or estimation process may be more efficient. Using all the resulting pairs may provide an accurate estimation.

According to one embodiment, the modeling includes determining a regression function describing the relationship between the values of the first and second attributes, wherein the re-determining the values of the first attribute is performed using the regression function. This may improve the modeling and may thus result in an accurate and improved distribution of the two data tables. Having an accurate distribution of records would further reduce the data movements while joining the two data tables.

According to one embodiment, the predefined dataset includes the two data tables and/or a reference sample different from the two data tables. Having the reference sample may prevent biased results.

According to one embodiment, the values of the first and second attributes in each data table of the two data tables having a correlation higher than a predetermined minimum correlation threshold. The present method may be applied if the correlation is high enough otherwise the re-distribution may not be accurate. Having an accurate distribution of records would further reduce the data movements while joining the two data tables. The correlation may for example be determined by a Pearson correlation coefficient such as $$Correl(X, Y) = \frac{\sum (x - \bar{x})(y - \bar{y})}{\sqrt{\sum (x - \bar{x})^2 \sum (y - \bar{y})^2}}.$$

According to one embodiment, in case the number of records whose re-determined computing node is different from the nodes on which the records are currently stored (or distributed) is higher than a predefined number of records, the redistributing including re-distributing the whole data tables using the re-determined values of the first attribute.

According to one embodiment, the method further includes performing in parallel the collocated joins of the two data tables. This may speed up the joining process making use of the optimal distribution of records of the present method.

According to one embodiment, the method further includes: before the redistributing performing all possible collocated joins of portions of the distributed records separately on the respective computing nodes, providing the results of the collocated joins, and redistributing the remaining non-joined records in response to receiving a request for redistributing. In other terms, before redistributing there may be nodes having collocated records of the two data tables that can be joined in a collocated manner. By first performing these collocated joins, it can be determined if their results are sufficient (e.g. for analysis). If they are not sufficient the redistribution may be performed. This may enable a user e.g. data scientist to analyze first few elements of results and decide to continue or not.

FIG. 1 represents a general computerized system, suited for implementing method steps as involved in the disclosure.

It will be appreciated that the methods described herein are at least partly non-interactive and automated by way of computerized systems, such as servers or embedded systems. In exemplary embodiments though, the methods described herein can be implemented in a (partly) interactive system. These methods can further be implemented in software 112 (including firmware 122), hardware (processor 105), or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose as computer 101.

In exemplary embodiments, in terms of hardware architecture, as shown in FIG. 1, the computer 101 includes a processor 105, memory 110 (main memory) coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a microprocessor, or generally any device for executing software instructions.

The memory 110 can include any one or combination of volatile memory elements (e.g., random access memory (RAM), such as DRAM, a static random access memory (SRAM), synchronous dynamic random access memory SDRAM, etc.)) and nonvolatile memory elements (e.g., a read-only memory (ROM), erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. instructions to manage databases such as a database management system.

The software in memory 110 shall also typically include a suitable operating system (OS 111). The OS 111 essentially controls the execution of other computer programs, such as possibly software 112 for implementing methods as described herein.

The methods described herein may be in the form of a source program or software 112, executable program or software 112 (object code), script, or any other entity comprising a set of instructions (for example, software 112) to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client, and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (for example firmware 122). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as hard disk drive (HDD) storage.

The storage 120 may comprise at least a first 127 and second 129 data tables. For example, the software 112 may receive (automatically or upon request) as input the data tables 127 and 129, or may download the data tables 127 and 129 from storage 120 or memory 110.

The term "data table" or data set as used herein refers to a collection of data that may be presented in tabular form. Each column in the data table may represent a particular variable or attribute. Each row in the data table may represent a given member, record, or entry of the data table.

The first data table 127 (TAB1) may comprise one or more columns 131A-B, wherein each column is represented by a respective attribute (e.g. "CD1" 131A and "CJ1" 131B). The rows or records of the data table 127 may each comprise values of the attributes 131A-B. The second data table 129 (TAB2) may comprise one or more columns 132A-B, wherein each column is represented by a respective attribute (e.g. "CD2" 132A and "CJ2" 132B). The rows or records of the data table 129 may each comprise values of the attributes 132A-B. The attributes 131A and 132A represent the same variable. The attributes 131B and 132B represent the same variable. For example, if attribute 131B is the Age of a user, the attribute 132B represent also the age. The attributes 131A and 132A may be distribution attributes while the attributes 131B and 132B may be the join attributes.

Although shown, for purpose of exemplification, as having only two same attributes, each of the first data table 127 and the second data table 129 may comprise more than their respective attributes which may be different between the two data tables. In other terms, beside the distribution and join attributes each of the two data tables may comprise additional attributes that may be different from the attributes of the other data table.

Multiple computing nodes Node1-NodeN may connect to the system 100 via network 165. A computing node Node1-NodeN is a basic unit used in computer science. Computing nodes Node1-NodeN may be devices such as a personal computer. Nodes contain data and also may link to other nodes. Links between nodes are often implemented by pointers. The computing nodes Node1-NodeN may be configured to communicate with each other e.g. via network 165 or via other communication links between them.

In order to perform collocated joins on a join attribute e.g. 131B and 132B, the records of the two data tables 127 and 129, as illustrated in FIG. 1, are distributed on computing nodes Node1-NodeN. The attributes 131A and 132A are used as distribution columns (or distribution attributes) which means that data are distributed on nodes based on values of these attributes 131A and 132A. The distribution is performed using a distribution function. For example, the distribution function may assign or associate a given node to a record of the two data tables 127 and 129 based on the values of the attributes 131A and 132A. For example, the distribution function may be a hash function. The hash function may for example be defined based on the number N of nodes. If for example, N=5, the hash function may be equal to h(x)=[(x+1)/2], where x is the value of the attribute 131A or 132A. For example, for the record having attribute value 4 of the attribute 131A the hash function would be equal to 2 which is the integer part of resulting 2.5 (=(4+1)/2). This record would then be distributed to and stored in the Node2 which corresponds to the number 2. The nodes Node1-NodeN may be indicated by or numbered 1 to N respectively, wherein a number 1-N may be the output (hash) of the hash function when applied on the values of the distribution attribute (for example attributes 131A, 132A). In this way, the data tables 127 and 129 may be distributed to the nodes Node1-NodeN (e.g. being numbered 1 to N respectively). This may enable an optimal use of resources of the nodes Node1-NodeN. For example, Node1 comprises a pair (135A, 137A) of partitions 135A and 137A of the two data tables 127 and 129 respectively. Node2 (numbered 2 or having hash 2) comprises a pair (135B, 137B) of the partitions 135B and 137B of the two data tables 127 and 129 respectively. Node3 (numbered 3 or having hash 3) comprises a pair (135C, 137C) of the partitions 135C and 137C of the two data tables 127 and 129 respectively. Node4 (numbered 4 or having hash 4) comprises a pair (135D, 137D) of the partitions 135D and 137D of the two data tables 127 and 129 respectively. Node5 (numbered 5 or having hash 5) comprises a pair (135E, 137E) of the partitions 135E and 137E of the two data tables 127 and 129 respectively. In the example of FIG. 1, the distribution result in 5 pairs of partitions. Among those resulting pairs of partitions (135A, 137A), (135B, 137B), (135C, 137C), (135D, 137D) and (135E, 137E) some pairs may not be used for performing a collocated join without movement of data. A partition may comprise one or more records of the data table.

Figure 2:
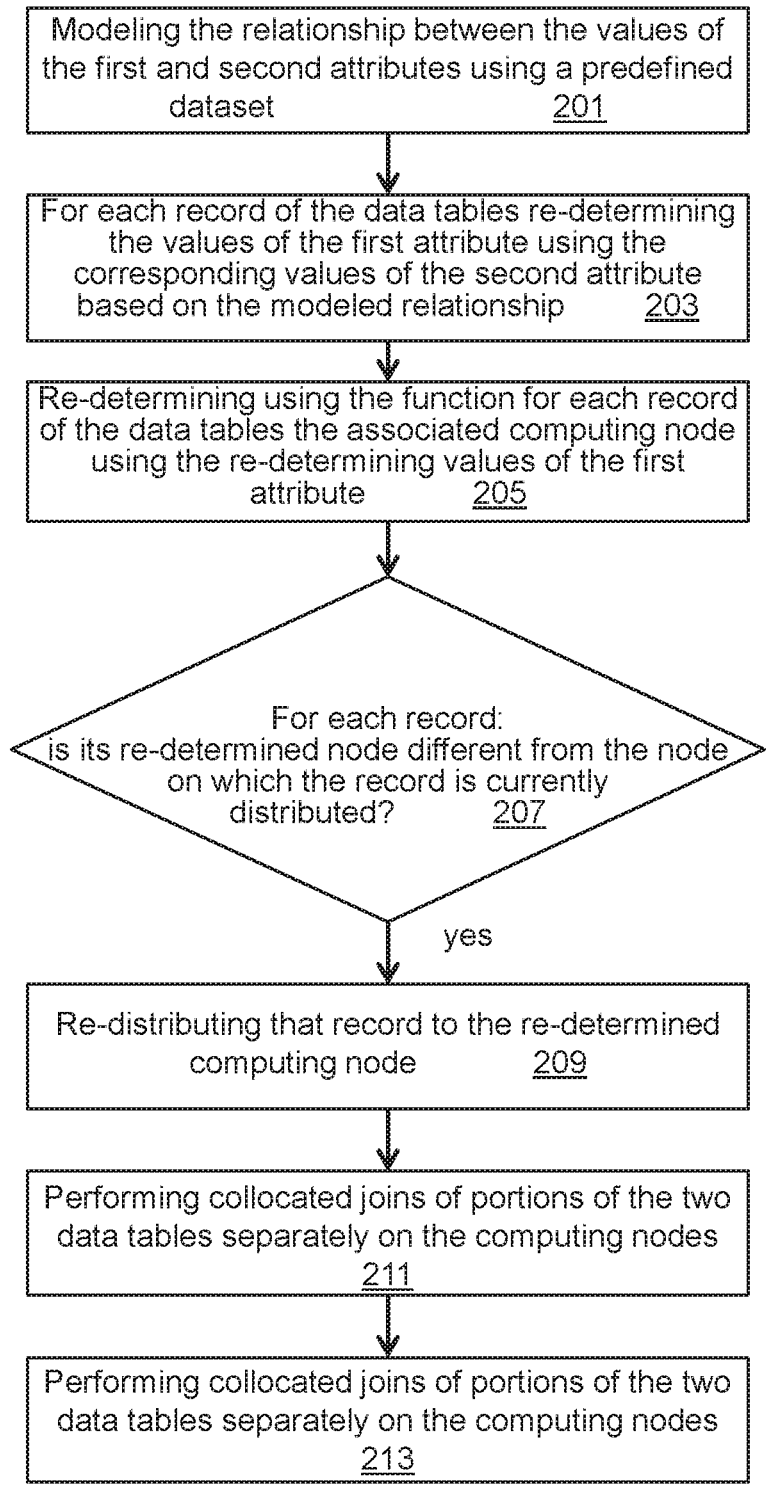
FIG. 2 is a flowchart of a method for joining two data tables on a join attribute.

FIG. 2 is a flowchart of a method for joining at least two data tables e.g. 127 and 129 on a join attribute e.g. 131B and 132B. For example, the present method may be applied if the correlation between the attributes 131A and 131B (132A and 132B9 is higher than a predefined threshold (e.g. 0.9). Following the example of FIG. 1, the correlations between these attributes are Correl(CD1,CJ1)=0.997 Correl(CD2, CJ2)=0.995. As correlations are strong in both data tables then the joining can be done locally on each node (collocated join). The correlation may for example be determined by a Pearson correlation coefficient such as $$Correl(X, Y) = \frac{\sum (x - \bar{x})(y - \bar{y})}{\sqrt{\sum (x - \bar{x})^2 \sum (y - \bar{y})^2}}.$$

For example, a structured query language (SQL) statement may be received for performing the joining of the two data tables 127 and 129. Following the example of the two data tables of FIG. 1, the SQL statement may be as follows: SELECT*FROM tab1 INNER JOIN tab2 on (tab1.CJ1=tab2.CJ2).

In step 201, the relationship between the values of the first 131A, 132A and second attributes 131B, 132B may be modeled using a predefined dataset. For example, the predefined dataset may comprise an amount of values of the first and second attribute enough for performing a reliable modeling of the relationship. In one example, the predefined dataset may comprise the first and/or second data tables 127 and 129. In another example, the predefined dataset may comprise databases other than the first and second data tables 127 and 129, wherein the databases comprise attributes 131A and 131B.

The modeling may for example comprise a regression analysis. The modeling of the relationship may comprise modeling the values of the first attribute 131A as a function of the corresponding values of the second attribute 131B. The modelling may for example comprise correlation that allows determining if any relationship exists between the attributes 131A and 131B; regression that allows a "line of best fit" to be determined or a non-linear and multivariate regression that allows for multiple predictor variables and the determination of "curves of best fit". For example, the modeling by a multivariate curve regression may be performed with smoothness constraints between points of a curve.

Figure 3:
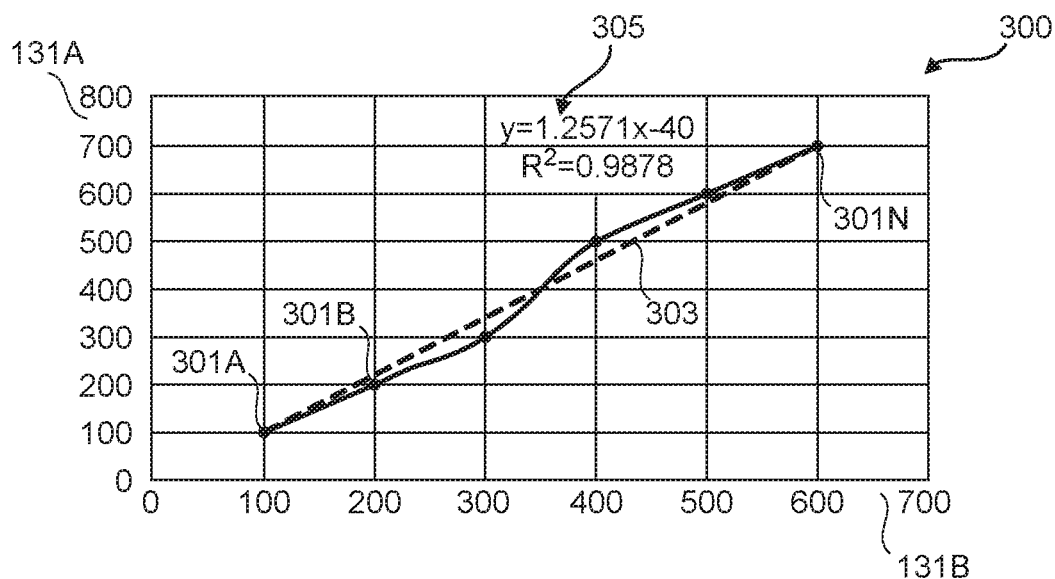
FIG. 3 shows a graph of attribute values and data tables to be joined.

Following the example of data tables 127 and 129 of FIG. 1, and as shown in graph 300 of FIG. 3, the modeling may comprise fitting the pairs of points defined by the respective values of the attributes 131A and 131B of each record. As shown in FIG. 3, each record may have an associated point 301A-N representing the pair of values (131A, 131B). For example, the point 301A is representing the pair of values (131B=100, 131A=100) of the attributes 131B and 131A. These points are fitted. In the example of FIG. 3, a linear fit (in an embodiment, the linear fit is a linear curve 303) is performed along the points 301A-N.

Step 201 may result in a function 305 that may be used to derive the value of attribute 131A (131B) from the corresponding value of attribute 131B (131A). Following the example of FIG. 3, the function may be 10*x. That is the values of the attribute 131B can be obtained by multiple 10 by the value of the corresponding value of the attribute 131A.

In step 203, for each record of the two data tables 127 and 129 the values of the first attribute 131A and 132A may be re-determined using the corresponding values of the second attribute 131B and 132B based on the modeled relationship. For example, the resulting function 305 that has been used to model the relationship between the attributes 131A and 131B, may be evaluated for each value of the attribute 131B to obtain the re-determined value of the first attribute 131A, 132A. Following the above example, the function 10*x is used to model the relationship between the attribute 131A and attribute 131B such that 131B=10*131A. Thus, in order to determine the value of the distribution attribute 131A the inverse of the function (131A=131B/10) may be used in order to obtain the values of the attributes 131A from the values of the attributes 131B. For example, the value of attribute 131A estimated from the value 67 of attribute 131B in record 301 of FIG. 3 would be equal to 7 which is obtained by rounding 6.7 (67/10).

In step 205, the distribution function (as defined above with reference to FIG. 1) may be used to re-determine for each record of the data tables 127 and 129 the associated computing node using the re-determined values (of step 203) of the first attribute 131A and 132A. Following the above example, the record 309 of the data table 127 having the value 67 of the attribute 131B and for which the value 7 of the attribute 131A is re-determined, the distribution function (x+1)/2 would result in 4 ((7+1)/2). Thus, Node4 is the new computing node where the record 309 is to be redistributed because it is different from the computing node Node3 where that record has been initially distributed as shown in FIG. 1.

As illustrated in FIG. 3, the re-determined computing nodes are indicated by additional columns 311 and 312 of the data tables 127 and 129. The columns 311 and 312 comprise values of the distribution function once applied on the re-determined values of the attributes 131A and 132A. As shown in FIG. 3, only the record 309 has a re-determined computing node which is different from the computing node assigned to it at the initial distribution (cf. FIG. 1).

In case (inquiry 207) a record of the data tables 127 and 129 whose re-determined computing node is different from the node on which the record is currently distributed, that record is re-distributed in step 209 to the re-determined computing node. For example, record 309 is redistributed to Node4. This is indicated in the data table 127 of FIG. 3. This may result in at least part of the two data tables 127 and 129 being re-distributed.

In step 209, on each computing node of the computing nodes Node1-NodeN a collocated join of records of the two data tables 127 and 129 that are distributed and/or re-distributed in the each computing node may be performed. In a collocated join, corresponding records of the data tables 127 and 129 are joined exist on the same node. The present method may enable to do the collocated joins with less movement of data while the join is being performed because the (re)distribution of the records is performed using an accurate approach.

If for example a pair of joinable records of the two data tables 127 and 129 does not require re-determination of the first attribute values as they already fit with the regression function these records can be joined immediately e.g. before redistributing the other records.

In step 211, the collocated joins results for joining the two data tables may be combined. Step 211 may for example be performed in computer 101 or in a combining node (e.g. NodeN) of the computing nodes Node1-NodeN.

FIG. 3 shows a graph of value of the attributes 131A as function of the corresponding values of the attribute 131B. For instance, graph 300 of FIG. 3 illustrates a linear curve 303 that can be used by to represent the relationship between the values of the two attributes 131A and 131B. FIG. 3, further shows the two data tables 127 and 129 where the re-determined computing nodes are indicated by columns 311 and 312 (and referred to as "New Hash") and the records to be re-distributed are indicated as well. The two data tables also comprise a column "Prev. Hash" indicating the node that has been initially determined for that record as described FIG. 1. For example, the record having CD1=1 is initially distributed or stored (cf. FIG. 1) to Node1 which is a node having number (or hash) 1. Thus, the value in column "Prev. Node" for that record is 1. The column "redistribution" indicates whether a record is to be redistributed to another node.

As described above, there are two data tables 127 and 129. Attributes (or columns) 131A and 132A are distribution columns (or distribution attributes) which means that data may be distributed on computing nodes Node1-NodeN based on hash of these columns 131A and 132A. In data table 127 (TAB1) column 131A (CD1) is correlated to column 131B (CJ1). In data table 129 (TAB2) column 132A (CD2) is correlated to column 132B (CJ2).

Both correlations can be described by the same regression model/function: f(X) in the way that: $CJ1_i=f(CD1_i)+e$ and $CJ2_i=f(CD2_i)+e$, where i is a record number of a record of the data tables 127 and 129. In more general, the function f(X) can be represented by an algorithm which models the regression. This results in additional statistics that have to be maintained e.g. for each column (other than distribution column) which are: regression function/model and corresponding correlation coefficient (e.g. as illustrated in graph 300 of FIG. 3).

The present method may be used to optimize the execution of query like which joins table TAB1 with table TAB2 with joining condition based on column CJ1 and CJ2 (for example CJ1=CJ2). Data from at least one table have to be redistributed in order to accomplish the join as CJ1 and CJ2 are not the distribution attributes.

With the present method, it may be determined (e.g. before modelling and re-distributing the records) that correlation between joining columns (CJ1) and distribution columns (CD1) is strong enough and most (or significant)

amount of data from both tables are collocated. In this way, the join operation may be a collocated join, according to which:

a. Each computing node joins all its data which fulfill the regression function (e=0), b. Data which does not suite the regression function f(X) are redistributed based on key which is calculated by inverse function of f(X): $KD1_i=f^{-1}(CJ1_i)$ and $KD2_i=f^{-1}(CJ2_i)$ wherein the calculated key indicates a new node different from the node in which data already exists.

This way of redistribution maximizes the probability that data are distributed to nodes on each there are already data with the same joining key values.

Standard correlation coefficient (e.g. Pearson product-moment correlation coefficient) may measure the strength of correlation but dos not necessary provide information how many values fulfill the regression function. For this reason, the regressions may be advantageous. Although correlation is very strong as shown in FIG. 3 none of value pair fit to linear function y=1.2571x−40. In order to give a valuable input, the correlation coefficient have to be calculated as a number of records which fit regression function (e=0).

The hash function may be adapted or determined based on values of distributions keys the data tables to be joined. For example, when using classic correlation coefficient measures (for example Pearson product-moment correlation coefficient) then it can be beneficial to change the hash function for distribution key to have a same node associated only to closer values of the distribution keys. If the regression function is linear then the optimal hash function should: distribute data without data skew, and minimize the standard deviation of distribution key value on each node, this way less data has to be redistributed.

Records 315, 316 and 317 can be joined immediately as they have no errors in reference to regression function f(x) (e.g. the value of CJ1 in record 315 is exactly equal to 10*values of CD1 of the record 315 and thus the same node initially determined (or on which the record 315 is currently stored) for the record 315 can be maintained). For the remaining records, the value of distribution key is recalculated and a new hash (NH) of it indicating the re-determined node can be determined by: $NH=h(f^{-1}(CJ1_i))$, where h is the hash function and f is the regression function (e.g. 10*x). Records of the two data tables 127 and 129 other than records 309 and 315-317 have errors in reference to regression function f(x); however, the re-determined node is the same as the node on which these records are currently stored (node initially determined).

In another example, a method comprises selectively moving just those rows (of the two data tables TAB1 and TAB2) that are not on the correct node for a collocated join. The method further comprises:

1. modeling the (possible) correlation between CD1 and CJ1 and between CD2 and CJ2 with the same regression model f (same parameters for CD1 and CD2)

a. $CJ1i=f(CD1i)+e1i$ b. $CJ2_{i=f}(CJ2i)+e2i$

2. Calculating new distribution keys K1 for CD1 and K2 for CD2 by a. $K1(CD1i)=f-1(CJ1i)$ b. $K2(CD2i)=f-1(CJ2i)$ 3. If the new distribution keys K1, K2 do not "differ much" from the current distribution based on CJ1, CJ2, moving just selectively those rows from the current node to the new node (based on K1, K2) that are currently on a "wrong" node. The checking whether the distributions "differ much" can be done at the beginning, based on correlation coefficients between (CD1, CJ1) and (CD2, CJ2), or later, as the new distribution keys may be calculated for all rows and then the decision can be made whether to switch over to the new distributions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), SRAM, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for joining two data tables on a join attribute, the data tables having at least a first and a second attribute, the second attribute being the join attribute, the method comprising:
   providing a function for associating a computing node to a given record based on a value of the first attribute of the given record;
   determining, using the function for each record of the two data tables, the associated computing node;
   distributing the records of the two data tables to the respective determined computing nodes;
   modeling a relationship between the values of the first and second attributes using a predefined dataset;
   re-determining, for the each record of the two data tables, the values of the first attribute using the corresponding values of the second attribute based on the model of the relationship;
   re-determining, using the function for the each record of the two data tables, the associated computing node using the re-determined values of the first attribute;
   for the each record of the two data tables, in response to determining that the re-determined computing node of the each record is different from the node on which the each record is currently distributed, re-distributing the each record to the re-determined computing node; and
   performing collocated joins of the distributed records and the redistributed record.

2. The method of claim 1 further comprising:
   wherein the distributing results in a pair of partitions of the two data tables in the each of the computing nodes; and
   in response to determining that the number of pairs of partitions in the sample, on which a collocated join can be performed is higher than a predefined threshold, determining a sample of the resulting pairs.

3. The method of claim 2, wherein the computing nodes corresponding to the sample are in idle mode.

4. The method of claim 1,
   wherein the modeling comprising determining a regression function describing the relationship between the values of the first and second attributes; and
   wherein the re-determining the values of the first attribute is performed using the regression function.

5. The method of claim 1, wherein the predefined dataset comprising the two data tables different from the two data tables.

6. The method of claim 1, wherein the values of the first and second attributes in each data table of the two data tables have a correlation higher than a predetermined minimum correlation threshold.

7. The method of claim 1, wherein the re-distributing comprises re-distributing the whole data tables using the re-determined values of the first attribute in response to determining that a number of records whose re-determined computing node is different from the nodes on which the records are currently stored is higher than a predefined number of records.

8. The method of claim 1, wherein the collocated joins of the two data tables are done in parallel.

9. The method of claim 1, providing, to the respective computing nodes in response to receiving a request for redistributing, the results of the collocated joins and redistributing the remaining non-joined records in response to the performing is done for all possible collocated joins of portions of the distributed records separately on the respective computing nodes.

10. A computer program product comprising a computer readable storage medium having program instructions embodied therewith, the program instructions executable by a processor to cause the processor to perform a method comprising:

providing a function for associating a computing node to a given record based on a value of the first attribute of the given record;

determining, using the function for each record of the two data tables, the associated computing node;

distributing the records of the two data tables to the respective determined computing nodes;

modeling a relationship between the values of the first and second attributes using a predefined dataset;

re-determining, for the each record of the two data tables, the values of the first attribute using the corresponding values of the second attribute based on the model of the relationship;

re-determining, using the function for the each record of the two data tables, the associated computing node using the re-determined values of the first attribute;

for the each record of the two data tables, in response to determining that the re-determined computing node of the each record is different from the node on which the each record is currently distributed, re-distributing the each record to the re-determined computing node; and performing collocated joins of the distributed records and the redistributed record.

* * * * *